US008694971B2

(12) United States Patent
Chandra et al.

(10) Patent No.: US 8,694,971 B2
(45) Date of Patent: Apr. 8, 2014

(54) SCALABLE PROPERTY-SENSITIVE POINTS-TO ANALYSIS FOR PROGRAM CODE

(75) Inventors: Satish Chandra, Nagawara (IN); Julian Dolby, Bronx, NY (US); Manu Sridharan, Boulder, CO (US); Frank Tip, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 13/253,521

(22) Filed: Oct. 5, 2011

(65) Prior Publication Data

US 2013/0091487 A1    Apr. 11, 2013

(51) Int. Cl.
G06F 9/44  (2006.01)
G06F 9/45  (2006.01)

(52) U.S. Cl.
USPC .......... 717/131; 717/124; 717/151; 717/159; 717/160

(58) Field of Classification Search
USPC ........... 717/124–135, 151, 159, 160; 714/37, 714/38.1
See application file for complete search history.

(56) References Cited

U.S. PATENT DOCUMENTS

| 7,797,691 | B2* | 9/2010 | Cockx et al. | 717/155 |
|---|---|---|---|---|
| 7,926,046 | B2* | 4/2011 | Halambi et al. | 717/151 |
| 2005/0188364 | A1* | 8/2005 | Cockx et al. | 717/159 |
| 2007/0169059 | A1* | 7/2007 | Halambi et al. | 717/160 |
| 2011/0088023 | A1* | 4/2011 | Haviv et al. | 717/155 |

OTHER PUBLICATIONS

Liang et al., "Efficient Points-to Analysis for Whole-Program Analysis," 1999, Springer-Verlag, p. 199-215.*
Rountev et al., "Points-to Analysis for Java Using Annotated Constraints," 2001, ACM, p. 43-55.*
Liang et al., "Extending and Evaluating Flow-insensitive and Context-insensitive Points-to Analyses for Java," Jun. 2001, ACM, p. 73-79.*
Grove et al., "A Framework for Call Graph Construction Algorithms," Nov. 2001, ACM, p. 685-746.*
Lhoták et al., "Scaling Java Points-to Analysis Using SPARK," 2003, Springer-Verlag, p. 153-169.*
Berndl et al., "Points-to Analysis using BDDs," Jun. 2003, ACM, p. 103-114.*
Lhoták et al., "Context-Sensitive Points-to Analysis: Is It Worth It?," 2006, Springer-Verlag, p. 47-64.*
Sridharan et al., "Refinement-Based Context-Sensitive Points-To Analysis for Java," Jun. 2006, ACM, p. 387-400.*

(Continued)

Primary Examiner — Qing Chen
(74) Attorney, Agent, or Firm — Jon A. Gibbons; Fleit Gibbons Gutman Bongini & Bianco PL

(57) ABSTRACT

A novel system, computer program product, and method are disclosed for transforming a program to facilitate points-to analysis. The method begins with accessing at least a portion of program code, such as JavaScript. In one example, a method with at least one dynamic property correlation is identified for extraction. When a method m is identified for extraction with the dynamic property correlation, a body of the loop l in the method m is extracted. A new method $m_p$ is created to include the body of the loop l with the variable i as a parameter. The loop l is substituted in the program code of the method m with the new method $m_p$ to create a transformed program code.

22 Claims, 10 Drawing Sheets

(56) References Cited

OTHER PUBLICATIONS

Maffeis et al., "An Operational Semantics for JavaScript," 2008, Springer-Verlag, p. 307-325.*
Sridharan et al., "The Complexity of Andersen's Analysis in Practice," 2009, Springer-Verlag, p. 205-221.*
Jang et al., "Points-to Analysis for JavaScript," Mar. 2009, ACM, p. 1930-1937.*
Tripp et al., "Hybrid Analysis for JavaScript Security Assessment," 2010, ACM.*
Blackshear et al., "The Flow-Insensitive Precision of Andersen's Analysis in Practice," 2011, Springer-Verlag.*
Feldthaus et al., "Tool-supported Refactoring for JavaScript," Oct. 2011, ACM.*
O. Agesen. The cartesian product algorithm: Simple and precise type inference of parametric polymorphism. In ECOOP, 1995.
J. D. An, A. Chaudhuri, J. S. Foster, and M. Hicks. Dynamic inference of static types for Ruby. In POPL, pp. 459-472, 2011.
L. O. Andersen. Program Analysis and Specialization for the C Programming Language. PhD thesis, University of Copenhagen, DIKU, 1994.
G. Balakrishnan and T. W. Reps. Recency-abstraction for heapallocated storage. In SAS, pp. 221-239, 2006.
S. Chaudhuri. Subcubic algorithms for recursive state machines. In POPL, 2008.
M. Fähndrich, J. S. Foster, Z. Su, and A. Aiken. Partial online cycle elimination in inclusion constraint graphs. In Conference on Programming Language Design and Implementation (PLDI), Montreal, Canada, Jun. 1998.
A. Feldthaus, T. Millstein, A. Møller, M. Schäfer, and F. Tip. Toolsupported refactoring for JavaScript. In Proc. ACM SIGPLAN Conference on Object-Oriented Programming, Systems, Languages, and Applications (OOPSLA'11), Oct. 2011.
S. Guarnieri and B. Livshits. Gulfstream: Incremental static analysis for streaming JavaScript applications. In Proceedings of the USENIX Conference on Web Application Development, Jun. 2010.
S. Guarnieri and V. B. Livshits. Gatekeeper: Mostly static enforcement of security and reliability policies for javascript code. In USENIX Security Symposium, pp. 151-168, 2009.
S. Guarnieri, M. Pistoia, O. Tripp, J. Dolby, S. Teilhet, and R. Berg. Saving the world wide web from vulnerable javascript. In Proceedings of the International Symposium on Software Testing and Analysis (ISSTA'11), 2011. To appear.
A. Guha, C. Saftoiu, and S. Krishnamurthi. The Essence of JavaScript. In Proc. 24th European Conference on Object-Oriented Programming, ECOOP '10, vol. 6183 of LNCS. Springer-Verlag, Jun. 2010.
S. H. Jensen, A. Møller, P. Thiemann. Type Analysis for JavaScript. In Proc. 16th International Static Analysis Symposium, SAS '09, vol. 5673 of LNCS. Springer-Verlag, Aug. 2009.
S. H. Jensen, A. Møller, and P. Thiemann. Interprocedural Analysis with Lazy Propagation. In Proc. 17th International Static Analysis Symposium, SAS '10, vol. 6337 of LNCS. Springer-Verlag, Sep. 2010.
J. Kodumal and A. Aiken. Regularly annotated set constraints. In PLDI, pp. 331-341, 2007.
D. Melski and T. W. Reps. Interconvertibility of a class of set constraints and context-free-language reachability. Theor. Comput. Sci., 248(1-2):29-98, 2000.
A. Milanova, A. Rountev, and B. G. Ryder. Parameterized object sensitivity for points-to analysis for Java. ACM Trans. Softw. Eng. Methodol., 14(1):1-41, 2005. ISSN 1049-331X.
A. Rountev, A. Milanova, and B. G. Ryder. Points-to analysis for Java using annotated constraints. In OOPSLA, Oct. 2001.
M. Schäfer, M. Verbaere, T. Ekman, and O. de Moor. Stepping Stones over the Refactoring Rubicon. In Proc. 23rd European Conference on Object-Oriented Programming, ECOOP '09, vol. 5653 of LNCS. Springer-Verlag, Jul. 2009.
Y. Smaragdakis, M. Bravenboer, and O. Lhoták. Pick your contexts well: understanding object-sensitivity. In POPL, pp. 17-30, 2011.
M. Sridharan, D. Gopan, L. Shan, and R. Bodik. Demand-driven points-to analysis for Java. In Conference on Object-Oriented Programming, Systems, Languages, and Applications (OOPSLA), 2005.
O. Tripp, M. Pistoia, S. J. Fink, M. Sridharan, and O. Weisman. TAJ: effective taint analysis of web applications. In PLDI, 2009.
D. Vardoulakis and O. Shivers. CFA2: A context-free approach to control-flow analysis. In ESOP, pp. 570-589, 2010.
Y. Zheng, T. Bao, and X. Zhang. Statically locating web application bugs caused by asynchronous calls. In WWW, pp. 805-814, 2011.

* cited by examiner

```
1   Math = {
2     pow : function (x, y) {
3       var   result = 1;
4       for    ( var i = 0; i < y;  i++) {
5         result   *= x;
6       };
7       return result;
8     },
9     abs : function(x) {
10      return (x  <  0)  ?   -x : x;
11    },
12    sum : function( ) {
13      var result = 0;
14      for  ( var i = 0; i < arguments . length; i++) {
15        result   += arguments [ i ] ;
16      };
17      return  result ;
18    },
19    PI  : 3.141592
20  };
21  var M =   Math;
22  var y  =   M.sum(3, 4, 5);   / / 12
23  var z  =   M.pow(y , 2); / /  144
24  alert (z) ;
```

FIG. 1

```
25 function extend(destination, source)   {
26   for (var property in  source)
27     destination[property] = source[property];
28   return destination;
29 }
30
31 extend(Object , {
32   extend:         extend,
33   inspect:        inspect,
34   . . .
35   isNumber:       isNumber,
36   isDate:         isDate,
37   isUndefined:    isUndefined,
38 } ) ;
39
40 Object . extend(String.prototype, (function( ) {
41   function   strip( ) {
42     return   this.replace(/^\s+/ , ' ')
43              .replace(/ \s+$/ , ' ');
44   }
45   function   escapeHTML( ) {
46     return   this.replace(/&/g,'&')
47              .replace(/</g,'&1t;')
48              .replace(/>/g,'>');
49   }
50   function   capitalize ( ) {
51     return   this.charAt(0).toUpperCase( ) +
52              this.substring(1).toLowerCase( );
53   }
54   function   empty( ) {
55     return   this == ' ';
56   }
57   return {
58     strip:          String.protoype.trim I I strip,
59     escapeHTML:     escapeHTML,
60     capitalize:     capitalize
61     empty:          empty
62   };
63 })( ));
```

FIG. 2

```
64 function extend(destination, source)   {
65   for (var property in  source)
66     (function(d,s,p){
67       d[p] = s[p];
68     }) (destination, source, property);
69   return destination;
70 }
```

FIG. 3

| Statement | Andersen's Rule | Set Constraint | |
|---|---|---|---|
| $x = \{\}^t$ | $\{o^t\} \subseteq pt(x)$ | $ref(o^t, o^t) \subseteq x$ | [Alloc] |
| $x[v] = y$ | $pt(y) \subseteq pt(o.s)$ where $o \in pt(x)$ and $s \in pt(v)$ | $x \subseteq ref(field(v,y).1)$ | [StoreField] |
| $y = x[v]$ | $pt(o.s) \subseteq pt(y)$ where $o \in pt(x)$ and $s \in pt(v)$ | $x \subseteq ref(0, field(v,y))$ | [LoadField] |
| $x = y$ | $pt(y) \subseteq pt(x)$ | $y \subseteq x$ | [Assign] |
| $v = \text{"name"}$ | $\{name\} \subseteq pt(v)$ | $str(\text{"name"}) \subseteq v$ | [VariableFields] |
| $y = x.nextprop()$ | $\{s\} \subseteq pt(y)$ where $o \in pt(x)$ and $o.s$ exists | | [PropertyIteration] |

FIG. 4

[Ref]  $\dfrac{\mathit{ref}(t_1,t_2) \subseteq x \qquad x \subseteq \mathit{ref}(t_3,t_4)}{t_3 \subseteq t_1,\ t_2 \subseteq t_4}$

[Field]  $\dfrac{\mathit{field}(F, x) \subseteq o^1 \qquad o^1 \subseteq \mathit{field}(g, z)}{\mathit{str}(\mathit{str}) \subseteq F \qquad \mathit{str}(\mathit{str}) \subseteq g}$
$$x \subseteq z$$

FIG. 5

```
1   x1 = { }              // x1 = { }
2   x2 = { }              // x2 = { }
3   x = { }               // x = { }
4   y = { }               // y = { }
5   f1 = "foo"
6   x[f1] = x1            // x["foo"] = x1
7   f2 = "bar"
8   x[f2] = x2            // x["bar"] = x2
9   f = "foo"
10  f = "bar"             // f = (..) ? "foo" : "bar"
11  t = x[f]
12  y[f] = t              // y[f] = x[f]
13  f3 = "foo"
14  r = v[f3]             // r = v["foo"]
```

FIG. 6

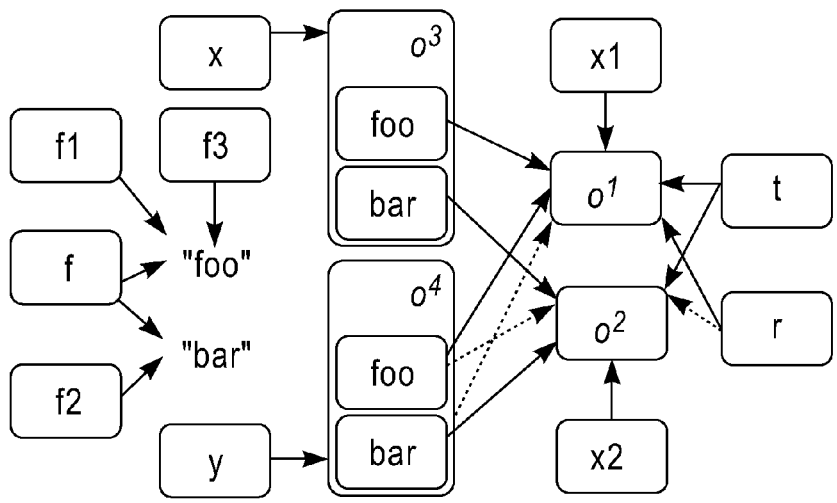

FIG. 7

| | Constraint | Reason |
|---|---|---|
| 1 | $ref(o^1, o^1) \subseteq x1$ | Statement 1 |
| 2 | $ref(o^2, o^2) \subseteq x2$ | Statement 2 |
| 3 | $ref(o^3, o^3) \subseteq x$ | Statement 3 |
| 4 | $ref(o^4, o^4) \subseteq y$ | Statement 4 |
| 5 | $str(foo) \subseteq F1$ | Statement 5 |
| 6 | $x \subseteq ref(field(F1, x1), 1)$ | Statement 6 |
| 7 | $str(bar) \subseteq F2$ | Statement 7 |
| 8 | $x \subseteq ref(field(F2, x2), 1)$ | Statement 8 |
| 9 | $str(foo) \subseteq F$ | Statement 9 |
| 10 | $str(bar) \subseteq F$ | Statement 10 |
| 11 | $x \subseteq ref(0, field(F, T))$ | Statement 11 |
| 12 | $y \subseteq ref(field(F, T), 1))$ | Statement 12 |
| 13 | $str(foo) \subseteq F3$ | Statement 13 |
| 14 | $y \subseteq ref(0, field(F3, R))$ | Statement 14 |
| 15 | $field(F1, x1) \subseteq o^3$ | (from 3, 6, Ref) |
| 16 | $field(F2, x2) \subseteq o^3$ | (from 3, 8, Ref) |
| 17 | $o^3 \subseteq field(F, T)$ | (from 3, 11, Ref) |
| 18 | $x1 \subseteq T$ | (from 15, 17, Field (foo)) |
| 19 | $x2 \subseteq T$ | (from 16, 17, Field (bar)) |
| 20 | $field(F, T) \subseteq o^4$ | (from 4, 12, Ref) |
| 21 | $o^4 \subseteq field(F3, R)$ | (from 4, 14, Ref) |
| 22 | $T \subseteq R$ | (from 20, 21, Field, (foo)) |
| 23 | $ref(o^1, o^1) \subseteq R$ | (from 1, 18, 22, transitivity) |
| 24 | $ref(o^2, o^2) \subseteq R$ | (from 2, 19, 22, transitivity) |

FIG. 8

$$[R1, Ref] \quad \frac{\mathsf{ref}(t_1, t_2) \subseteq x \quad x \subseteq \mathsf{ref}(t_3, t_4)}{t_3 \subseteq t_1, t_2 \subseteq t_4}$$

$$[R2, Trans] \quad \frac{\mathsf{ref}(t_1, t_2) \subseteq x \quad x \subseteq y}{\mathsf{ref}(t_1, t_2) \subseteq y}$$

$$[R3, Field] \quad \frac{\mathsf{field}(\mathsf{str}, x) \subseteq o^1 \quad o^1 \subseteq \mathsf{field}(\mathsf{str}, z)}{x \subseteq z}$$

FIG. 9

$$[R3', Field] \quad \frac{\mathit{field'}(\mathsf{str}, x) \subseteq o^1 \quad o^1 \subseteq \mathit{field'}(\mathsf{str}, z)}{x \subseteq z}$$

$$[R4, Trans] \quad \frac{\mathit{str}(\mathsf{str}) \subseteq x \quad x \subseteq y}{\mathit{str}(\mathsf{str}) \subseteq y}$$

$$[R5, Cross] \quad \frac{\mathit{str}(\mathsf{str}) \subseteq F \quad \mathsf{field}(F, V) \subseteq o^1}{\mathit{field'}(\mathsf{str}, V) \subseteq o^1}$$

FIG. 10

| Benchmark | Home Page | Version | LOC | Extracted |
|---|---|---|---|---|
| dojo | http://www.dojotoolkit.org | 1.61 | 4738 | 13 |
| jquery | http://jquery.com | 1.6.1 | 5903 | 8 |
| mootools | http://mootools.net | 1.3.2 | 3615 | 8 |
| protoyype | http://protoypejs.org | 1.7 | 4948 | 5 |
| scriptaculous | http://script.aculo.us | 1.9 | 8509 | 6 |
| yui | http://developer.yahoo.com/yui | 2.9 | 464 | 2 |

FIG. 11

| Benchmark | Baseline | | | Our Technique | | |
|---|---|---|---|---|---|---|
| | Time (s) | PTo Edges | Reachable | Time (s) | PTo Edges | Reachable |
| dojo | * | ≥1198.6M | ≥730 | 10.7 | 787777 | 110 |
| jquery | * | ≥107.6M | ≥271 | 8.8 | 734518 | 174 |
| mootools | 0.7 | 21464 | 86 | 0.8 | 20944 | 81 |
| protoyype | * | ≥115.9M | ≥322 | 3.0 | 106559 | 133 |
| scriptaculous | * | ≥74.9M | ≥434 | 4.5 | 187254 | 154 |
| yui | * | ≥32.2M | ≥104 | 0.1 | 7265 | 61 |

FIG. 12

```
1   def copy(source, dest):
2       for k in source:
3           dest [k] = source [k]
4
5   x = { }
6   name1 = "foo"
7   name2 = "bar"
8   obj1 = ["one"]
9   obj2 = ["two"]
10  x[name1] = obj1
11  x[name2] = obj2
12  y = { }
13  copy (x, y)
14  print y
```

FIG. 13

```
1   class A {
2     int x;
3     int y;
4     void foo(int result){ x += result; }
5     int bar ( ){ return x; }
6   }
7   class B extends A {
8     void foo(int result){ y += result; }
9     int bar( ){ return y ; }
10  }
11  class C {
12  // may point to an object of type A or B
13  static A a = ... ;
14  void zap ( ) {
15    int result = a.bar( ) ;
16    a.foo(result);
17  }
18  }
```

FIG. 14

SCALABLE PROPERTY-SENSITIVE POINTS-TO ANALYSIS FOR PROGRAM CODE

FIELD OF THE INVENTION

The present invention generally relates to transforming a program, and more particularly to transforming a program to facilitate points-to analysis for call graph generation.

BACKGROUND

JavaScript is rapidly gaining in popularity because it enables programmers to write rich web applications with full-featured user interfaces and portability across desktop and mobile platforms. Recently, pointer analysis for JavaScript has been used to enable applications such as finding security vulnerabilities [10, 11], bug finding [13], and automated refactoring [8]. However, the presence of several hard-to-analyze language features in JavaScript and other scripting languages has a detrimental impact on the scalability and precision of traditional points-to analysis algorithms such as Andersen's analysis, making the applications of such algorithms impractical for those languages. Thus, there is need for techniques that make pointer analysis for languages such as JavaScript practical.

BRIEF SUMMARY

Several features of JavaScript conspire to make the language a uniquely challenging environment for pointer analysis. These features include first-class functions, "dynamic" accesses of properties (object fields) where the property name is the value of an expression, the ability to create a property simply by writing to it, and a construct for iterating over an object's property names. We identify property sensitivity, a generalization of field sensitivity to handle dynamic property accesses, as critical to obtaining sufficiently precise points-to and call graph information for JavaScript. We show that, surprisingly, extending a standard implementation of Andersen's points-to analysis with property sensitivity causes the implementation's worst-case running time to grow from $O(N^3)$ to $O(N^4)$, where N is the size of the program. Scalability issues due to property sensitivity are practical as well as theoretical—we found that these initially prevented our points-to analysis implementation from analyzing a number of widely used JavaScript frameworks, e.g., prototype.js and jquery. We devised a solution in which points-to analysis is made more precise via local tracking of important correlations, implemented by extracting new functions and analyzing them with targeted context sensitivity. Our experimental results show that this enhancement sped up property-sensitive analysis of several popular JavaScript frameworks by orders of magnitude and enabled significantly more precise call graphs to be computed.

The present invention addresses the problem that several hard-to-analyze language features in program code, such as JavaScript, have a detrimental impact on the scalability and precision of traditional points-to-analysis algorithms such as Andersen's analysis [3]. We analyze the source of these scalability problems in detail, and present a solution in which points-to analysis is made more precise via local tracking of important correlations, implemented by extracting new functions and analyzing them with targeted context sensitivity.

In JavaScript, an object has zero or more properties, each of which is identified by a unique name. Properties may contain any kind of value, including first-class functions, and programmers may define a "method" on an object by assigning a function to one of its properties, as in the following example:
o.p1=f1; o.p2=f2; o.p1( ... );

To identify the precise call target for the call o.p1( ... ) an analysis must be able to compute points-to targets for o.p1 and o.p2 separately and not conflate them. This is usually achieved by a field sensitive analysis. What makes a field-sensitive analysis challenging for JavaScript is the fact that properties are "first class", in the following sense:
e="foo"; ... ; o[e]=v;

If o is a variable that is bound to an object, and if e is an expression that evaluates to or can be coerced to a string value "foo", then programmers may use a dynamic property access of the form o[e] to access property foo in object o. Properties need not be declared in a type; writing to a property of an object has the effect of creating that property if it did not exist in that object yet.

First-class properties require a generalization of field sensitive analysis, which we call property sensitive analysis. However, property-sensitive points-to analysis poses both theoretical and practical challenges. We show that, surprisingly, extending a standard implementation of Andersen's points-to analysis [3, 7] with property sensitivity causes the implementation to run in worst-case $O(N^4)$ time, where N denotes the size of the program, compared to the typical $O(N^3)$ bound for other programming languages. Interestingly, this increased complexity is not merely a matter of theoretical interest, as we experienced when we unsuccessfully attempted to apply a straightforward property-sensitive implementation of Andersen's analysis to several widely-used JavaScript frameworks. These frameworks often contain core operations that read or write all of an object's properties within loops, sometimes copying property values between two objects. In combination with other previously discussed dynamic features of JavaScript, such operations often cause an explosion in analysis imprecision that makes call graph construction intractable in practice (this will be illustrated with an example in Section 2). And while these operations are most idiomatic and common in JavaScript, exactly the same operations can be easily written in other scripting languages, e.g., Python.

In summary, a novel system, computer program product, and method are disclosed for transforming a program to facilitate points-to analysis. The method begins with accessing at least a portion of program code, for example a program written in JavaScript. A method with at least one dynamic property correlation is identified for extraction. In one embodiment of the invention, the method m identified for extraction contains one or more dynamic property writes x[v]=y in the program code, and the method m identified for extraction satisfies two conditions: i) a dynamic property write occurs in m and is in a loop l with at least one loop variable i in a set of loop variables of the method m; and ii) v is data dependent on i. When a method m is identified in response to these two conditions, a body of the loop l in the method m is extracted. A new method $m_p$ is created to include the body of the loop l with the variable i as a parameter. The body of the loop l is substituted in the program code with a call to the new method $m_p$ to create a transformed program code.

In one example, context sensitivity is applied. Specifically, the context-sensitive analysis of the program is performed in which contexts are distinguished for the new method $m_p$ based on possible values of the parameter i corresponding to the original loop variable.

The present invention has wide applicability, which includes applications such as analyzing applications for security vulnerabilities, that rely on call graphs and/or points-to information. Our invention enables the creation of accurate call graphs and points-to information in cases where this was previously not possible. Other applications of the technique exist in the areas of integrated development environment (IDE) tools, and compiler optimization.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 1 is an example program code used for property-sensitive analysis;

FIG. 2 is an example program code from protype.js library;

FIG. 3 is of a new method extracted from FIG. 2 of a new extend function;

FIG. 4 shows a table that presents rules for a property-sensitive points-to-analysis;

FIG. 5 is a set of resolution rules used to compute a fixed-point;

FIG. 6 is an example normalized program code;

FIG. 7 shows a graph of points-to relations computed by property-sensitive points-to analysis for the example in FIG. 6;

FIG. 8 shows a table illustrating a graph of points-to relations computed by property-sensitive points-to analysis for the example in FIG. 6;

FIG. 9 is a set of resolution rules applied for constraints devised from first four statements;

FIG. 10 is a set of new constructor field';

FIG. 11 shows a table of results of constructing call graphs for six different JavaScript frameworks;

FIG. 12 shows a table containing results of experimental evaluations;

FIG. 13 is an example of program code, where the present invention would improve a points-to analysis with property-sensitive handling of Python dictionaries;

FIG. 14 is an example of program code of correlated method calls in Java;

DETAILED DESCRIPTION

1. Introduction

Figure 15:
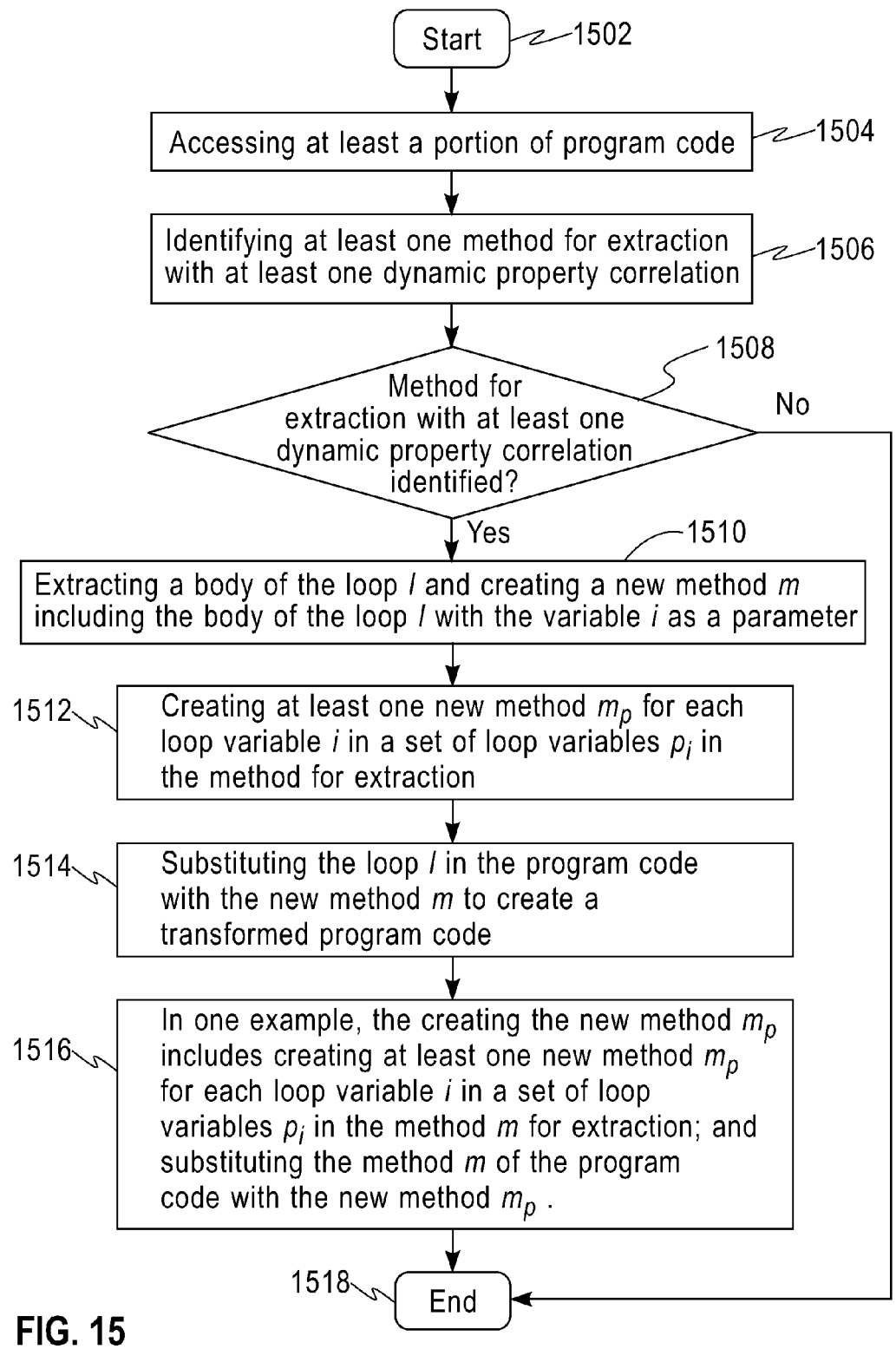
FIG. 15 is an operational flow diagram illustrating one example of a process for transforming a program to facilitate points-to analysis.

We devised a solution that addresses the scalability problems encountered by traditional points-to analysis algorithms when they are applied to languages such as JavaScript. This solution achieves greater scalability by making the points-to analysis more precise. We observed that for property writes that cause imprecision in practice, there is often an obvious correlation between the updated location and the stored value that is ignored by the points-to analysis. For example, for the statement x[p]:=y[p] (which copies the value for property p in y to property p in x), a standard points-to analysis does not track the fact the same property p is accessed on both sides of the assignment, leading to conflation of all related property-value pairs and cascading imprecision. We regain precision by, in effect, locally tracking such correlations around problematic writes. For the aforementioned example, we would separately analyze the code for each possible value of p, enabling the analysis to only copy (abstract) values between the points-to sets of the same property in each object, dramatically improving precision and performance. This correlation tracking is achieved by extracting the relevant code into new functions and analyzing those functions with targeted context sensitivity. The resulting context-sensitivity policy can be viewed as a generalization upon Agesen's Cartesian Product Algorithm (CPA) [1] and more recent object-sensitive algorithms [17, 20].

We implemented the algorithm on top of the WALA infrastructure and conducted experiments on 6 widely-used JavaScript frameworks: dojo, jquery, mootools, prototype.js, scriptaculous and YUI. On these benchmarks, where WALA's default property-sensitive implementation of Andersen's analysis often ran out of memory and produced very imprecise results, our new algorithm successfully computed points-to information and call graphs in under 15 seconds, an enormous improvement.

The remainder of this patent is organized as follows: Section 2 presents motivating examples that illustrate the complexity of points-to analysis for JavaScript. Section 3 presents a constraint-based formalization of property-sensitive points-to analysis for JavaScript and shows the $O(N^4)$ worst-case running time of a standard implementation extended with property sensitivity. Section 4 presents our approach for making property-sensitive points-to analysis scale in practice. Experimental results are presented in Section 5. Section 6 discusses how similar scalability issues may arise in other languages, demonstrating that the examples and techniques are applicable to other areas. Finally, related work is discussed in Section 7 and conclusions are presented in Section 8. A high-level process flow is shown in Section 9 along with an example computer system useful for implementing the invention in Section 10.

2. Motivation

In this section, we consider a few small JavaScript programs to illustrate how some of JavaScript's dynamic features impact points-to analysis and call-graph construction.

2.1 The Need for Property Sensitivity

JavaScript's model of objects and functions is extremely flexible. Consider the example of FIG. 1, which shows the declaration of an objectMath with several properties (inspired by the JavaScript standard library [6, Section 15]), which will be use to illustrate the concept of property-sensitive analysis. Unlike statically-typed object-oriented languages like Java, JavaScript has no built-in concept of an object instance method, and a JavaScript property may contain any type of object, including functions. On lines 2-12, functions are stored in the properties pow, abs, and sum, and on line 19, a constant is stored in property PI. Note that there is nothing that prevents programmers from changing the Math object by, e.g., storing the value 2 in the pow property, or from assigning a different function to the sum property. In other words, the binding of functions to properties may change at run-time.

In JavaScript, it is legal to invoke a function with any number of arguments, and the actual parameters that are passed in a function call expression can be accessed via the built-in arguments array. For example, the sum function does not have any explicitly declared formal parameters, and accesses the arguments array on lines 14 and 15 to compute the sum of the values that are passed in as actual parameters.

In JavaScript's execution model, there is no built-in concept of a virtual method call with a receiver. Instead, a call such as M.pow(y,2) consists of a property dereference followed by a function call:

var_a=M.pow;
_a.call(M, y, 2);

Now consider performing a points-to analysis to determine what functions may be invoked from each call site. Unless the points-to analysis computes a separate points-to set for each property in each object, we are faced with a potentially great loss of precision. Concretely, for this example, a property-insensitive points-to analysis would use a single points-to set for the properties pow, abs, sum, and PI, which means that it would have to assume that a call such as M.pow(y,2) could invoke any of the functions pow, abs, and sum. Note that, since functions can be invoked with an arbitrary number of arguments, the number of actual parameters in a call cannot be used to narrow down the set of potential call targets.

2.2 The Impact of JavaScript's Dynamic Language Features

FIG. 2 shows a few fragments of the widely used prototype.js library, which we will use to illustrate how certain idiosyncratic features of JavaScript pose further challenges for points-to analysis. In particular, the example illustrates prototype's mechanism for dynamically extending objects, which is frequently used within prototype itself. Several other frameworks, including jquery, offer similar functionality for dynamically extending objects.

The program of FIG. 2 declares a function extend on lines 25-29. The body of this function contains a for . . . in loop, a construct for iterating through the names of all properties present in an object. Here, the for . . . in loop iterates through the property names of the object bound to parameter source, binding them to loop variable property. The program retrieves the value of each property using a dynamic property access expression, source[property], and then stores that value in a location determined by another dynamic property access expression, destination[property]. The following aspects of JavaScript's semantics should be noted:

The name of the property accessed by a dynamic property access expression is computed at run-time.
In JavaScript, a write to a property of an object has the effect of creating that property if it does not exist yet.

Together, these observations imply that it is possible for a JavaScript program to create objects with an unbounded number of properties, which is a fundamental difference with statically typed languages such as Java or C# in which the number of properties (fields) in an object is bounded by the size of the object's class.

FIG. 2 also shows an example of how extend is used inside the prototype.js library itself.

on lines 31-38, extend is called to bind several functions to properties in the built-in Object object. Note that the extend function itself is bound to a property extend of Object.
on lines 40-63, the extend function is invoked via the reference in Object.extend in order to extend the prototype of the built-in String object with properties strip, escape-HTML, capitalize, and empty. Note that, having extended the prototype of String in this manner, JavaScript's delegation mechanism ensures that these functions are now available on any String object.

2.3 Pointer Analysis

We now discuss applying a points-to analysis like Andersen's analysis [3] to the example program. The first question that arises is how to maintain the requisite separate points-to sets for each object property to achieve reasonable precision. Field-sensitive Andersen's analysis must be extended to handle dynamic property accesses properly, and we detail such an extension in Section 3. We call a field-sensitive analysis extended in this manner property sensitive.

Consider applying a straightforward property-sensitive version of Andersen's analysis to the example program, which uses the points-to sets of parameter name expressions to handle dynamic property accesses (see Section 3 for details). Variable property on line 27 may be bound to any property name of objects bound to source. In particular, property may refer to any property name of the object passed as the second argument in the call on line 31 ("extend", "inspect", etc.). This means that the points-to set for the dynamic property expression source[property] includes all functions of the source object. The write to destination[property] therefore causes Andersen's to add all of these functions to the points-to sets for properties "extend", "inspect", etc. in the destination object (recall that a write to a non-existent property creates the property). Therefore, such an analysis would conclude, very imprecisely, that the call Object.extend( . . . ) on line 40 might invoke any of the functions extend, inspect, . . . , or isUndefined.

By the same reasoning, it can be seen that due to the invocation of extend( ) at line 40, this points-to analysis would compute for each property added to String.prototype a points-to set that includes all of the functions strip( ), escape HTML( ), capitalize( ), and empty( ). Consequently, a call on any one of these properties on any String object is approximated as a call to any one of them by the analysis. The resulting loss of precision is detrimental because String objects are used pervasively.

Precision loss as described above arose for several widely-used JavaScript frameworks that we attempted to analyze (see Section 5), making straightforward property-sensitive points-to analysis intractable (due to the excessive space required to store the highly imprecise points-to relation). This problem is exacerbated by the fact that JavaScript frameworks use mechanisms such as the extend function of FIG. 2 internally during initialization, which means that merely including the code for these libraries in a web page will trigger the problem.

In Section 4, we propose a solution to this problem that can dramatically improve both precision and performance. The key idea is to enhance Andersen's analysis to track key correlations involving the property name in problematic code fragments involving dynamic property writes. For our example, the enhanced analysis would track the correlated value of property between the read of source[property] and the write to destination[property], thereby precisely reasoning that a property value may only be copied from source to the property with the same name in destination.

Our enhanced analysis is implemented by first extracting the relevant code into a new method, in this case the body of a for . . . in loop; the transformed version of extend( ) is shown in FIG. 3. The new method is analyzed context-sensitively with a separate context for each value of the property name parameter (p for the example), thereby achieving the desired precision. This context-sensitivity policy is reminiscent of Agesen's Cartesian Product Algorithm [1] and object-sensitive analyses [17, 20] in the sense that different contexts are introduced for a function based on the values passed as arguments (further discussion in Section 4.3). With these enhancements, we were able to efficiently compute call graphs for several JavaScript frameworks that could not be analyzed with a straightforward property-sensitive analysis.

3. Complexity of Property-Sensitive Points-To Analysis

The table shown in FIG. 4 presents a formulation of property-sensitive points-to analysis. We elide a set constraint for PropertyIteration statements as their presence does not affect the complexity analysis. In this section, we formulate property-sensitive points-to analysis for a core language based on the pointer access statements of JavaScript. Then, we show that a standard implementation of Andersen's analysis runs in worst-case $O(N^4)$ time when extended with property sensitivity, where N is the size of the program, as opposed to the standard $O(N^3)$ bound without first-class property names.

The relevant core language features of JavaScript are shown on the leftmost column of the table shown in FIG. 4. Note that unlike field accesses in a language like Java, property stores and loads act much like array stores and loads, where the equivalent of array indices are string constants. We discuss handling of computed property names in Section 5.1. Property names are first class, so they can be copied between variables and stored and retrieved from data structures. Properties are added to objects when values are first stored in them. The y=x.nextProp( ) statement type is used to model the JavaScript for . . . in construct (see Section 2); it updates y with the next property name of the object x points to.

The middle column of the table shown in FIG. 4 presents Andersen-style points-to analysis rules for the core language. The only way in which this differs from a standard Andersen-style analysis for Java is that it supports tracking of property names as they flow through assignments. We represent the points-to set of a program variable x as pt(x). The rules are presented as inclusion constraints over points-to sets of program variables and of properties of abstract objects (e.g., o.name). We assume that object allocations are named with one abstract heap object per static statement, e.g., abstract object $o^i$ for statement i. Note that pt-sets track not just abstract objects, but also string constants possibly representing property names.

The third column of the table shown in FIG. 4, formalizes the analysis using set constraints, for the purpose of analyzing its complexity. We have extended the (field insensitive, for C) set constraint formulation of Fähndrich et al. [7] to handle first-class properties. We could not reuse the simpler formulations of field-sensitive analysis from prior work, e.g. [15, 18], because properties in JavaScript are first class values, whereas prior work assumes accesses with constant field names.

Our set constraint system describes inclusion constraints between terms described by the following grammar:

t::=X, Y, $\mathcal{F}$ . . .
|ref($t_1,t_2$)
|field ($t_1,t_2$)
|str(t)
|0, 1, $o^i$, str, . . .

Variables X, Y, etc. represent set variables corresponding to program variables. (We use $\mathcal{F}$ to refer to a variable that contains a property name, but we do not assume strong typing to be able to distinguish between different classes of variables.) Constants 0 and 1 represent the empty set and universal set, respectively, constants $o^i$ denote allocation sites, and str terms (in typewriter font) represent string constants. The constructor ref is contravariant in its first argument and covariant in its second argument. The remaining constructors are covariant in all arguments.

The objective of this constraint system is to decide if variable x can point to an object allocated at site i: this holds if ref($o^i,o^i$)⊂X is entailed by the constraint system. The Alloc statement (see FIG. 4) simply creates such a constraint; the apparent redundancy of two occurrences of $o^i$ will be explained shortly. The constraint for Assign is obvious. The interesting, and perhaps counter-intuitive constraints are for StoreField and LoadField. These rules are best explained via a simple example (a more detailed example is given later):

n:x=; x[v]=y

The constraints generated are: ref (o", o")⊂X and X⊂ref(field(V,Y),1). A constraint resolution rule (described later) infers that field(V,Y)⊂o". Note that the direction of inclusion is reversed because ref is contravariant in the first argument. Thus, the way the constraints are generated, coupled with a contravariant argument, orchestrates the "flow" of y to property v of o". The placement of field is peculiar: field (V,Y)⊂o" should not be read as property v of y flows into o". LoadField works similarly, but in that case we propagate the flow in the other way. This is the reason we require two arguments in ref.

We generate set constraints from program statements as described in table in FIG. 5. To read a points-to solution from this constraint system, we need to compute a fixed point using constraint resolution rules. For our system, in addition to transitivity of inclusion (not shown), the resolution in shown in FIG. 5 applies.

The Ref rule pushes the inclusion to the corresponding arguments of the ref terms, respecting the contravariance of the first argument. The Field rule matches up property loads with stores: note that side conditions str(str)⊂$\mathcal{F}$ and str(str)⊂$\mathcal{G}$ ensure that at least one common field can be matched up.

We illustrate the working of these resolution rules using an example.

Example

Consider the sequence of statements in FIG. 6. The statements that a programmer would write are given in the comments, but we show normalized statements to exhibit our analysis. FIG. 7 us a graph of points-to relations computed by property-sensitive points-to analysis for the example in FIG. 6. The dashed edges are spurious.

The table shown in FIG. 8 shows generated constraints for the example in FIG. 6. In lines 18, 19, and 22, we specify which property was found common when applying the Field rule.

The constraints are generated as shown in the table shown in FIG. 8. The system correctly infers that ref($o^1$, $o^1$)⊂$\mathcal{R}$, meaning r may point to object $o^1$, but also imprecisely infers ref($o^2,o^2$)⊂$\mathcal{R}$. All inferred points-to relations are shown in FIG. 2 (spurious points-to edges are dashed).

Since $\mathcal{F}$ (see the table shown in FIG. 8) contains both the strings "foo" and "bar", the Field rule is able to propagate both X1 and X2 to $\mathcal{T}$ (see lines 15-19 in the table shown in FIG. 8). Similarly, the Field rule propagates $\mathcal{T}$ to $\mathcal{R}$ (lines 20-22) irrespective of the fact that only foo field is being read. The analysis is not powerful enough to maintain correlation that y["foo"] gets its value only from x["foo"] and that y["bar"] gets its value only from x["bar"]. Section 4.2 shows how we avoid losing this correlation, increasing precision.

Complexity Analysis without First-Class Properties

To set the stage for complexity analysis with first-class properties, we first describe the complexity of this analysis without first-class properties. For the moment, we assume that field names are manifestly present at the load and store statements, i.e., field names cannot be stored in variables and propagated around. Essentially, we only have Java-like statements of the form x.f.

The overall fixed-point computation is managed by a standard worklist algorithm. Initially, constraints that are read off from the program statements are added into a worklist They are then taken off the worklist one at a time and the above rules are applied, adding only new constraints to the worklist. We compute complexity by counting the number of times constraint resolution rules apply to arrive at the fixed point (assuming appropriate data structures to make each rule application run in constant time).

Including transitivity rules, the following three resolution rules apply for the constraints derived from the first four statement kinds. (For the constructor field, the first argument is always a string constant in this case.) See FIG. 9.

Assume we have T ref terms, V program variables (and allocations), and D field terms. For R1, each variable X can participate in at most T constraints of the form $ref(t_1, t_2) \subseteq X$, and same number of constraints of the form $X \subseteq ref(\overline{t_3,t_4})$, leading to V*T*T applications. For R2, the constraint $\overline{X \subseteq Y}$ only matches up V times, leading to V*V*T applications. For R3, there are up to D*V field constraints of the kind $field(str, X) \subseteq o^i$. Although there are same number of constraints of the type $\overline{o^i \subseteq field}$ (str, $\mathcal{Z}$), we only need to look at V of them since $\overline{str}$ is the same. We count the number of times each rule can be applied:

R1: V*T*T
R2: V*V*T
R3: V*D*V (The analysis of such a system was inspired by Melski and Reps' work relating CFL and set constraints [16].) The total amount of work is the sum of the above quantities. V, T, and D are all limited by the number of program statements N, so we have a worst-case bound of $O(N^3)$.

Complexity Analysis with First-Class Properties

Now we modify the formalization to also allow first-class properties. (The VariableFields statement type in the table shown in FIG. 4 is now allowed.) We modify R3 (to R3') and add two additional rules. We also introduce a new constructor field'. See FIG. 10.

R3' and R5 implement the Field rule with property name matching. R5, the Cross rule, "caches" the information that str(str) may flow into variable $\mathcal{F}$, which may be used in a field access, by creating a new term with constructor field'; this simplifies our counting.

We count how many times each rule can fire. Assume we have S string constants.

R1: V*T*T
R2: V*V*T
R3': V*V*D*S
R4: V*V*S
R5: V*V*V*S

For R5, for each field variable $\mathcal{F}$, we can have up to S constraints of the type $str(str) \subseteq \mathcal{F}$, and up to V*V terms of the type field $(\mathcal{F},V) \subseteq o^i$, so the rule can be applied $V^3*S$ times, yielding up to $\overline{D*S}$ field'terms.

For R3', each $o^i$ can participate in up to D*S constraints of the kind field'(str, X) $\subseteq o^i$. While there are as many constraints of the form $o^i \subseteq \overline{field'(str,}$ $\mathcal{Z}$), we only have to look at those in which the first argument of field' is the same as in the first constraint. Thus, the number of times R3' can fire is V*D*S*V. Consequently, the worst-case running time for closing this constraint system is $O(N^4)$.

Extending this core set of statements with functions does not impact the complexity if we are computing a context-insensitive points-to analysis.

4. Scalability in Practice

We now discuss our techniques for making property-sensitive points-to analysis for JavaScript scale in practice. We discuss what code patterns cause precision and scalability problems in practice (Section 4.1), show how local tracking of certain correlations can address the issues (Section 4.2), and detail how we achieve the correlation tracking by extracting code into new methods and analyzing them with targeted context sensitivity (Section 4.3).

4.1 Problematic Code in Practice

As discussed in Section 3, the imprecision of Andersen's analysis can lead to conflation of properties accessed in a dynamic property read or write. This conflation becomes increasingly problematic as the points-to set of the variable holding the property name grows, since the analysis cannot fall back on types to bound the set of possibly-accessed properties. Unfortunately, examples like the extend( ) function from prototype.js, shown in FIG. 2 and reproduced here, create a "perfect storm" of problems for property-sensitive points-to analysis that lead to significant conflation:

```
function extend(destination, source) {
    for (property in source) {
        destination[property]= source[property];
    }
    return destination;
}
```

We have two dynamic property accesses, with the value in source[property] flowing to destination[property]. Hence, from Section 3, we know that Andersen's analysis will copy all property values of source to each property of destination whose name is in the points-to set of property.

The property variable will have a large points-to set since it is the for . . . in loop variable (modeled in Andersen's analysis by the statement property=source.nextProp( ); see the table shown in FIG. 4).

In property.js, extend( ) is invoked from several call sites with distinct objects (examples in FIG. 2). Due to context insensitivity, Andersen's analysis conflates the properties of the destination and source objects across all of these call sites.

Together, these problems lead property-sensitive Andersen's analysis to not scale in practice for many JavaScript frameworks.

4.2 Scalability via Correlation Tracking

We improve the scalability of property-sensitive points-to analysis by enabling tracking of key correlations relevant to dynamic property accesses. We first illustrate our technique for the example from FIG. 6 of Section 3. Recall that the points-to analysis imprecisely concluded that $o_2$ could flow to r for the example. Consider the following modified version of the example:

| | | |
|---|---|---|
| 1. | x1 = { } | // x1 = { } |
| 2. | x2 = { } | // x2 = { } |
| 3. | x = { } | // x = { } |
| 4. | y = { } | // y = { } |
| 5. | f1 = "foo" | |
| 6. | x[f1] = x1 | // x["foo"] = x1 |
| 7. | f2 = "bar" | |
| 8. | x[f2] = x2 | // x["bar"] = x2 |
| 9. | f4 = "foo" | |
| 10. | t1 = x[f4] | |
| 11. | y[f4] = t1 | // t1 = x["foo"]; y["foo"] = t1 |
| 12. | f5 = "bar" | |
| 13. | t2 = x[f5] | |
| 14. | y[f5] = t2 | // t2 = x["bar"]; y["bar"] = t2 |
| 15. | f3 = "foo" | |
| 16. | r = y[f3] | // r = y["foo"] |

Here, we have split variable f from FIG. 4 into two variables f4 and f5, respectively corresponding to f's possible "foo" and "bar" values. Similarly, we have created two corresponding clones of the dynamic property accesses from lines 11-12 of FIG. 6 (lines 10-11 and 13-14 above).

Applying the resolution rules from Section 3 for the modified example (as in the table shown in FIG. 8; we omit the details), we derive field($\mathcal{F}$ 1, X1)⊂$o^3$ and $o^3$ ⊂field ($\mathcal{F}$ 4, $\mathcal{T}$ 1). This yields X1 ⊂ $\mathcal{T}$ 1 via the Field rule, since $\mathcal{F}$ 1 and $\mathcal{F}$ 4 have "foo" in common. We can also derive field($\mathcal{F}$ 1, X1)⊂$o^3$ and $o^3$ ⊂field($\mathcal{F}$ 5, $\mathcal{T}$ 2). But, critically, the conclusion X1 ⊂ $\mathcal{T}$ 2 cannot be drawn, because the Field rule does not apply: $\mathcal{F}$ 1 and $\mathcal{F}$ 5 have no string in common. Similarly, we cannot derive $\mathcal{T}$ 2 ⊂ $\mathcal{R}$, i.e., the imprecise result that $o_2$ could flow to r has been removed.

This modified example is handled more precisely since the cloning enables the points-to analysis to track the correlation of the property name between the copied dynamic property reads and writes—it only copies x["foo"] to y["foo"] and x["bar"] to y["bar"]. This same technique enables more precise handling of problematic code in practice, like prototype.js's extend( ) function. There, the analysis would be able to prove that values could only be copied from a property of source to the same property of destination.

In general, say we have a statement $p_i$=e, where $p_i$ is a local in SSA form (i.e., $p_i$=e is the only definition of $p_i$). Let S be the statements in the live range of $p_i$. Informally, the live range for SSA local $p_i$ is the code after its definition up until (1) a definition of a new SSA local for the original variable p or (2) the end of $p_i$'s scope. Our goal is to enhance Andersen's analysis to recognize that any execution path through S must always read the same value from $p_i$, thereby capturing correlated uses of $p_i$ in S.

In principle, this precision enhancement can be achieved via a simple program transformation that clones S for each possible value of $p_i$. For the moment, assume S is free of method calls; they will be handled in Section 4.3. The transformed code is as follows:

```
p_i = e ;
if ( p_i == "val__1") {
    freshLocals(S[ "val__1" / p_i])
} else if ( p_i == "val__2") {
    freshLocals(S[ "val__2" / p_i])
}. else if ( p_i == "val__n") {
    freshLocals(S[ "val__n" / p_i]) .
}
```

The transformation adds conditionals that branch on all possible values of $p_i$. In each branch, the appropriate value is substituted for $p_i$, thereby converting any dynamic property access a[$p_i$] to an access a.val_i with a constant property name. Fresh local variable names are introduced to avoid conflation of results across the branches. Each clone contains all statements in the live range of $p_i$, ensuring that Andersen's will be able to match read and write accesses based on $p_i$ precisely.

For prototype.js's extend( ) method, applying the transformation would yield:

```
function extend(destination, source) {
    for (property in source)
        if (property == "val__1") {
            destination.val__1 = source.val__1;
        } else if (property == "val__2") {
            destination.val__2 = source.val__2;
```
```
    }
    ... return destination;
}
```

In the next sub-section, we describe how our implementation achieves the effect of this transformation with context sensitivity.

4.3 Implementing Correlation Tracking

We implement tracking of correlations in the manner described in Section 4.2 by extracting the relevant code into a fresh method and analyzing it with targeted context sensitivity. In general, given $p_i$=e with statements S in its live range, S is extracted into a fresh method, with parameters and return values added as needed. This transformation was already shown for the case of extend( ) in FIG. 3, reproduced below:

```
function extend (destination, source) {
    for (var property in source)
        (function (d, s, p) {
            d[p] = s[p]
        } (destination, source, property);
    return destination;
}
```

Extracted methods are analyzed context-sensitively with a fresh context for each value of their property name parameter. For our general case, a new context would be created for each value of the extracted method parameter corresponding to $p_i$ (the p parameter for the transformed version of extend( ) above). This policy effectively clones the extracted method for each possible value of $p_i$, matching the cloning in the program transformation of Section 4.2 and hence adding the desired correlation tracking to Andersen's analysis. When the extracted method contains no method calls, our context sensitivity policy can be viewed as a variant of object sensitivity [17, 20], using the property name parameter instead of the this parameter to distinguish contexts.

Note that introducing this limited form of context sensitivity does not improve the worst-case running time of the property-sensitive analysis (in fact, for crafted inputs the worst case could be worse). However, the technique provides a dramatic improvement in scalability in practice because we end up creating much sparser points-to graphs.

For JavaScript, the method extraction process is simplified by the language's lexical scoping rules. JavaScript functions can read and write variables declared in enclosing lexical scopes. Hence, method extraction can introduce a formal parameter for just the variable used to distinguish contexts, leaving other variable accesses intact and avoiding introduction of any return values. For the extend( ) function example, our actual transformed code is as follows:

```
function extend(destination, source) {
    for (var property in source)
        (function(p) {
            destination[p] = source[p];
        })(property);
    return destination;
}
```

Note that using lexical accesses in extracted methods requires the points-to analysis to handle such accesses precisely, as will be discussed further in Section 5.

Handling Method Calls: Thus far, we have not considered the case where S can contain method calls. Context-insensitive analysis of such calls could again lead to precision loss, e.g., in the following modified version of the extend( ) example:

```
function doRead(p) return this[p]; }
function extend(destination, source) {
    for (property in source) {
        val = source.doRead(property);
        destination[property] = val;
    }
    return destination;
}
```

Here, if calls to doRead( ) are analyzed context-insensitively, then the benefits of context-sensitive analysis of the extracted loop body would be lost. While the above example is contrived, we have observed cases in practice where method calls in S required context-sensitive handling. Furthermore, some of these calls were recursive, so a naïve exhaustive inlining approach would not solve the problem.

We handle method calls from extracted methods by extending our context sensitivity policy as follows: for any clone $m_c$ corresponding to analysis of extracted method m in context c, all (transitive) callees of $m_c$ should also be analyzed in context c. For the example above, after extracting the loop body into a method m, we would create a clone $m_p$ for each possible value of property, and each $m_p$ would invoke a corresponding clone $doRead_p$. This approach has two desirable properties:

- It guarantees that for any two distinct clones of the extracted method, the reachable code from those clones is disjoint. This ensures there will be no conflation in analysis results between the clones due to merging at a common callee. This guarantee is analogous to that obtained from creating separate statement copies in the intraprocedural case. While exhaustive inlining gives the same guarantee when no recursion is present, our technique creates fewer clones when there are multiple call sites for the same method.
- In the presence of recursive calls, termination is still ensured, as the extracted method is analyzed in a finite number of contexts. The analysis could still be expensive in the presence of deep call chains, however. One simple optimization is to use context-insensitive analysis for a callee c when it can be proved that c cannot access any state dependent on the variable used for distinguishing contexts.

We note that this context sensitivity scheme goes beyond what is expressible with object sensitivity [17, 20] or even Agesen's Cartesian Product Algorithm [1]. Both of those techniques create contexts based on the values of (a subset of) the actual parameters to a call. In contrast, our technique can create contexts for a callee of an extracted method m based on the values of one of m's parameters, even when that parameter is not directly passed to the callee. For example, if we have:

function m(p) {var x={f:p}; n(x);}

We would analyze the call to n in separate contexts for each value of p, even though it is not passed directly to n.

Other Cases: In some cases, S may contain loop statements like continue which must be converted to return statements during method extraction. While this transformation is straightforward, more complex control flow may make method extraction difficult to achieve in all cases (see the literature on the "Extract Method" refactoring for further discussion, e.g., [19]). Also, the relevant code for multiple property writes may overlap, necessitating extraction of a combined method and appropriate adjustments to the context-sensitivity policy—we have not yet observed this case in practice.

When To Apply: Thus far, we have found it sufficient to apply method extraction and additional context sensitivity for dynamic property writes x[v]=y that meet the following two conditions:

1. The write is in a loop l with loop variable i.
2. v is data dependent on i.

This covers for . . . in loops like that in the extend( ) method, but also standard for loops that iterate over an array of property names (a situation that we have observed in practice). It would be straightforward to apply the technique in other cases as well, e.g., if a frequently-invoked method took a property name as a parameter (in this case, no method extraction would be necessary).

The table shown in FIG. 11 shows information on the JavaScript frameworks used as benchmarks in our experiments. The "LOC" column gives the number of lines of non-blank, non-comment source code, and the "Extracted" column gives the number of new methods extracted by our technique. For the yui benchmark, only the core yahoo.js file was analyzed.

5. Evaluation

Here we present an experimental evaluation of the effectiveness of our techniques to make property-sensitive points-to analysis for JavaScript scale in practice.

5.1 Implementation

Our analysis implementation is built atop the T. J. Watson Libraries for Analysis (WALA). WALA provides a points-to analysis implementation for JavaScript, which we extended with our techniques. Our work was motivated by the fact that WALA's default JavaScript points-to analysis could not scale to analyze many JavaScript frameworks. By building on WALA, we were able to re-use its handling of various intricate JavaScript language constructs such as the prototype chain and arguments array (also discussed in previous work [10, 13]). WALA also provides handwritten models of various pre-defined JavaScript objects and standard library functions.

Default Context Sensitivity: WALA's JavaScript points-to analysis uses context sensitivity by default to handle two key JavaScript language features, and we preserved these techniques in our modified version of the analysis. The first construct is new, used to allocate objects. The new construct has a complex semantics in JavaScript based on dispatch to a first-class function value [6, Section 11.2.2]. In some cases, a new expression may not even create an object [6, Section 15.2.2.1]. WALA handles new by generating synthetic methods to model the behaviors of possible callees. As any one of these synthetic methods may be invoked for multiple new expressions, they must be analyzed with one level of call-string context in order to achieve the standard allocation-site-based heap abstraction of Andersen's analysis.

Accesses to variables in enclosing lexical scopes are also handled via context sensitivity by WALA. Handling lexical scoping for JavaScript can be complicated, as nested functions may read and/or write variables declared in enclosing methods [6, Section 10.2], e.g.:

```
1. function f( ) {
2.   var x₁ = 3;
3.   var y = function ff( ) x = x + 1; };
4.   y( ); // reads x₁, writes x₂
```

```
5. print(x); // reads x_2, prints 4
6. y( ); // reads x_2, writes x_3
7. alert(x); // reads x_3, displays 5
8. }
```

WALA aims to gives SSA names to variables in its intermediate representation whenever possible, even for variables like x in the above example that get updated by calls to nested functions. Dynamically, there are 3 definitions for x in this example: its declaration at line 2 and the assignment at line 3 in ff that is called at lines 4 and 6 in f. The subscripts on x represent the three distinct definitions of it. To provide an SSA view of x in the above example, WALA does two things:
1. The calls at lines 4 and 6 are treated as definitions of x, so now there are 3 statements in f that define x. These definitions are added as they are discovered, and result in the SSA representation of f being updated.
2. The function ff is analyzed in distinct contexts for the two calls; the context for the call at line 4 gets dataflow for x from the definition at line 2, whereas the context for the call at line 6 gets its dataflow for x from the definition from the call at line 4.

This technique aims to provide the most precise possible dataflow for lexically-scoped variables, and in practice the cost is usually low since lexically-nested writes are infrequent.

Note that our method extraction technique is eased by WALA's precise treatment of lexical accesses, as fewer parameters and return values need to be introduced (see Section 4.3).

Unknown Properties: While our analysis formulation in Section 3 allowed for only constant strings as property names, in a JavaScript property access a[e], e may be an arbitrary expression, computed using user inputs, arithmetic, complex string operations, etc. Hence, in some cases WALA cannot compute a complete set of constant properties that a statement may access, i.e., the statement may access an unknown property. WALA handles such cases conservatively via abstract object properties, each of which represents the values stored in all properties of some (abstract) object. When created, an abstract property is initialized with all possible property values discovered for the object thus far. A read of an unknown object property is modeled as reading the object's abstract property, while a write to an unknown property is treated as possibly updating the object's abstract property and any other property whose name is known. This strategy avoids pollution in the case where all reads and writes are to known constant property names.

Soundness: WALA's points-to analysis attempts to treat most commonly used JavaScript constructs conservatively. However, unsoundness will occur in some cases:
  with blocks, which put the properties of an object in the local scope. This construct is not currently handled soundly in WALA, but $\lambda_{JS}$ [12] shows a promising approach. Of our current benchmarks, only 2 use with: dojo and scriptaculous. We inspected both benchmarks manually and found that the uses of with would only have a very minor, local impact on the final points-to relation.
  Calls to eval and function constructor calls when either of these take non-constant strings, since both of these treat an arbitrary string as code. This is analogous to how analyses of Java treat complex reflection and dynamic code loading.
  Our model of the JavaScript library is incomplete and it is possible that this can make analysis unsound. Note once again that this is similar to how analyses of Java work, since few analyses model the intricate native implementation of portions of the libraries.

In spite of possible unsoundness, the points-to analysis is still useful for a variety of clients, e.g., bug-finding tools.

5.2 Experimental Setup

In our experiments, we attempted to construct call graphs using WALA's standard points-to analysis and a version modified with the techniques presented in Section 4 for the six well-known JavaScript frameworks listed in the table shown in FIG. 11. According to online, these were the six most popular JavaScript frameworks in use on top web sites, as of July 2010. The lines of code in each framework were counted using CLOC. Information on the JavaScript frameworks used as benchmarks in our experiments. The "LOC" column gives the number of lines of non-blank, non-comment source code, and the "Extracted" column gives the number of new methods extracted by our technique. For the yui benchmark, only the core yahoo.js file was analyzed.

For each benchmark, we analyzed a client HTML page that simply loaded the framework's necessary script(s) but did not contain code that invoked the framework in any other way. However, note that simply loading each framework causes significant framework initialization code to run. For our experiments, we applied the method extraction technique described in Section 4 as a manual source-to-source transformation (the transformation could easily be automated). As shown in the table shown in FIG. 11, the number of new methods created per framework ranged from 2 to 13.

We performed a separate manual transformation of the extend function in jquery to address its complex use of the arguments array, which presents a challenge for program analysis orthogonal to our focus in this patent. Here is an excerpt of the relevant code:

```
jQuery.extend = function ( ) {
    var target = arguments[0] || , i = 1,
        length = arguments.length, deep = false;
    // Handle a deep copy situation
    if ( typeof target === "boolean" ) {
        deep = target;
        target = arguments[1] || ;
// skip the boolean and the target
        i = 2; ..
        . ...
    }
    // extend jQuery itself if only one argument is passed
    if ( length === i )
        target = this;
        --i;
    } ...
    }
```

The function explicitly tests both the number of arguments and their types, with significantly different behaviors based on the results. If the first argument is a boolean, its value determines whether a deep copy is performed, and if there is only one argument, then its properties are copied to this. Any sort of traditional flow-insensitive analysis of this function gets hopelessly confused about what is being copied where, since target, the destination of the copy, can be an argument, a fresh object, or this depending upon what is passed.

We manually specialized the above function for the different possible numbers and types of arguments, and this specialized version is analyzed in both configurations of the points-to analysis. Without the specialization, neither the baseline analysis nor our modified version is able to build a call graph for jquery within a 5 GB heap. We believe that developing an analysis to automatically perform these specializations would be relatively straightforward, and the analysis could be applied only for functions with problematic dynamic property writes and complex use of the arguments array.

All our experiments were run on a laptop with a 2.66 GHz Intel Core 2 Duo processor and 8 GB RAM running Mac OS X 10.6.8. We used the Oracle Java HotSpot 64-Bit Server VM, version 1.6.0_26, configured with a 5 GB maximum heap.

5.3 Results

The table shown in FIG. 12 presents the results of our experimental evaluation. The "Baseline" and "Our Technique" columns give results for WALA's built-in JavaScript points-to analysis and the analysis modified with our techniques, respectively. "Time (s)" gives running time, "PTo Edges" gives the number of edges in the final points-to graph, and "Reachable" gives the number of methods deemed reachable by the analysis. A '*' in the "Time (s)" column indicates the analysis could not complete within the time limit of 10 minutes, in which case the data in the corresponding "PTo Edges" and "Reachable" columns are lower bounds based on partial analysis results.

Our techniques for enhancing the scalability of the property-sensitive analysis clearly make a dramatic difference: for five of the six benchmarks, the baseline analysis could not complete within an 10 minute timeout, but with our techniques a call graph was constructed in 15 seconds or less. (We used an 10 minute timeout since running the baseline analysis for longer caused a Java OutOfMemoryError with a 5 GB heap.) For these timeout cases, our technique reduces the number of points-to edges computed by orders of magnitude, indicating the significantly reduced amount of work required to compute a result. The number of reachable methods is also dramatically reduced, reflecting improved precision with our technique enabled. For mootools, both configurations terminate in roughly one second, with a slight precision improvement in terms of reachable methods for our technique. In summary, these results clearly show that our technique dramatically improved scalability and precision of property-sensitive points-to analysis for a range of JavaScript frameworks.

6. Other Languages

In this section, we discuss two examples where our techniques for scaling property-sensitive JavaScript points-to analysis may improve the precision and scalability of program analyses for other programming languages. Section 6.1 discusses how our techniques could improve the precision of points-to analysis for Python programs. Then, in Section 6.2, we discuss how our techniques may help remove infeasible paths from the interprocedural control-flow graph in the presence of correlated method calls in Java programs. Many examples analogous to these two cases exist for other languages.

6.1 Python

Python is a highly dynamic scripting language, just as is JavaScript. It has analogs to the problematic features of JavaScript that we encountered: dir to list the properties of an object and getattr and setattr for first-class property access. Hence, an equivalent of the extend function of prototype.js (see FIG. 2) can be easily written:

```
def extend(a, b):
    for f in dir(b): setattr(a, f, getattr(b, f))
```

This style is less idiomatic and pervasive in Python than in JavaScript; more idiomatic is use of a Python dictionary to record mappings from keys to values, and Python dictionaries have many similarities with JavaScript objects. Programmers can define dictionary constants by simply enumerating a list of comma-separated key:value pairs between curly braces. Python also allows programmers to retrieve the value associated with a key s from a dictionary d using an expression d[e], where e is an expression that evaluates to s at run-time. Furthermore, Python provides a feature for iterating through the keys of a dictionary (like Javascript for . . . in loops), and writing a key-value pair to a dictionary that does not contain an entry for the key creates such an entry (similar to JavaScript's dynamic property writes).

FIG. 13 shows an example where our techniques could improve a points-to analysis with property-sensitive handling of Python dictionaries. The copy function on lines 1-3 is analogous to our JavaScript extend( ) function (see FIG. 2), copying all key-value pairs from source to dest. The rest of the code creates a small dictionary and assigns it to variable x lines 5-11 and then copies its entries to y via a call to copy (lines 12-13). A straightforward property-sensitive points-to analysis will conflate the values for different keys of the dest parameter of copy, in this case concluding that y['foo'] and y['bar'] could point to either of the objects allocated on lines 8 and 9. Our techniques could be applied to remove this imprecision by extracting the dest[k]=source[k] statement from copy into a new method and analyzing it with separate contexts for each value of k.

6.2 Correlated Method Calls in Java

Consider the Java program of FIG. 14, which shows a class A that declares instance fields x and y, and a class B that inherits from class A. Class A defines methods foo( ) and bar( ), and class B provides overriding definitions for these methods. Note that the methods in class A only access field x, and that the methods in class B only access field y. Also shown is a class C that contains a method zap( ) that calls bar( ) and foo( ) on a field a that has static type A. If we assume that a may point to objects of type A or B at run-time, and that no other threads can access a, there are two possible execution paths:

If a points to an object of type A, then the call on line 15 dispatches to A.bar( ) and the call on line 16 dispatches to A.foo( ). This will have the effect of doubling the value of a.x, and leaving a.y unchanged.

If a points to an object of type B, then the call on line 15 dispatches to B.bar( ) and the call on line 16 dispatches to B.foo( ). This will have the effect of doubling the value of a.y, and leaving a.x unchanged.

Now, assume that a standard field-sensitive Andersen-style points-to analysis is applied to this program. Such an analysis would compute a points-to set for a that contains objects of types A and B. This means that the the call to a.bar( ) will be assumed to dispatch to A.bar( ) or B.bar( ). which means that either a.x or a.y is assumed to be read. Likewise, the call to foo( ) will be assumed to dispatch to A.foo( ) or B.foo( ) which means that either a.x or a.y is assumed to be written. Consequently, the analysis concludes there is possible data flow from a.x to a.y and from a.y to a.x.

This loss in precision is due to the fact that the analysis is unable to keep track of the correlation between the dispatch behavior in the calls to bar( ) and foo( ). This is similar to the loss of precision seen when analyzing the JavaScript extend( ) function (see FIG. 2) without our new techniques, as there the correlation between the value of property on the left- and right-hand sides of the write statement is lost. We can apply our techniques here to regain precision by analyzing the body of zap separately for each possible value of a, achieved by extracting the body of zap into a new function parameterized by a and applying a context-sensitivity policy that creates a separate context for each concrete type of a. For cases with many correlated calls, this technique could help subsequent interprocedural data flow analyses by filtering many infeasible paths from the interprocedural control-flow graph.

7. Related Work

We distinguish several threads of related work.

Complexity: Chaudhuri [5] presents an optimization to CFL-reachability/recursive state machine algorithms (which can handle standard field-sensitive points-to analysis [21]) that yields $O(N^3/\log(N))$ worst-case running time. We conjecture that similar techniques could shave a logarithmic factor from our $O(N^4)$ bound for property-sensitive points-to analysis, but devising and analyzing such an algorithm remains as future work.

JavaScript Semantics: Guha et al. [12] present a formalization of JavaScript semantics that clarifies many of the issues in analyzing the language. They formalize the semantics of a core language, including computed property names, prototype pointers and other troublesome features. Our implementation is not based on translating JavaScript to $\lambda_{JS}$, but even with such an approach the key analysis challenges that we face would remain.

Argument sensitivity: The Cartesian product algorithm [1] (CPA) and object sensitivity [17] both served as inspirations for our context-sensitivity policy for extracted methods (see Section 4.3). These techniques create contexts based on the concrete types of arguments at call sites, thus allowing analysis of a function to be specialized based on what types of values are being passed to it. CPA does this for all parameters, and object sensitivity applies just to the receiver argument.

Smaragdakis et al. [20] conduct a thorough analysis of object sensitivity, classifying the prior work in terms of how it chooses contexts based on receiver objects. They also introduce type sensitivity in which contexts are distinguished not based on abstract objects but rather on the types of these abstract objects. They show that this is a promising approach for improving the cost/precision balance in analysis, but clearly it depends on having a useful notion of program type. JavaScript lacks such a notion, since most user objects are simply of type 'Object'.

Other JavaScript Analyses: JavaScript combines the program analysis challenges of a higher-order functional language with those of a very dynamic scripting language, and considerable work has focused on addressing some of these issues.

Jensen et al. [13, 14] have dealt with issues arising from JavaScript's prototype-based inheritance and complex type hierarchy with automatic coercions. They construct a detailed lattice of types, and they adapt the recency abstraction of Balakrishnan et al. [4] to precisely handle writes to inherited properties in constructors.

Vardoulakis and Shivers [23] introduce CFA2 to tackle the limitations of CFA with respect to the deep nesting of first-class function calls common in higher-order languages. They use a continuation passing style transformation of the code and a summarization scheme based on local state to match deeply-nested calls and returns.

These analysis techniques address other challenges that arise when analyzing dynamic languages such as JavaScript, and are complementary to our work. There is also much work that focuses on problems that are specific to JavaScript:

Zheng et al. [24] present a JavaScript analysis to find data races in code used in asynchronous ways in a Web browser. They analyze JavaScript code that uses several of the popular frameworks that we handle (jquery, prototype, and yui); however, they do not actually analyze the framework code, but instead design inference rules with the framework semantics encoded.

Guarnieri and Livshits's Gatekeeper [10] and Gulfstream [9] tools perform points-to analyses for JavaScript as the basis for various kinds of safety checks. They focus on enabling incremental analysis in the face of dynamically-loaded code on Web pages. Their approach to first-class property accesses is to treat them precisely when a single possible property name can be determined statically (by a separate constant propagation pass), and otherwise assume that any property might be referenced. They did not focus on the problems caused by constructs such as for . . . in loops.

Dynamic Type Inference for Scripting Languages: An et al. [2] present a dynamic inference for static types in Ruby. Faced with similar challenges applying static analysis to those presented by JavaScript, they chose to implement a dynamic analysis. They prove a soundness theorem despite being dynamic, and being dynamic avoids many of the approximations required for static analysis. Their focus is on type inference, so they do not track some information needed for our analysis, like the values of different string constants. Also, their technique requires test inputs, which are not readily available for some JavaScript frameworks and could be challenging to generate.

Property Sensitivity: Tripp et al. [22] present a taint analysis for Java that implements a form of property sensitivity when handling idioms in J2EE. J2EE uses a context structure that is essentially a hash table, and it is usually referenced in practice with constant strings as keys. This presents the same flavor of problem that we have for precise tracking of data flow through these contexts. Their work employs an abstraction of the semantics of the context object rather than the actual Java code, and applies property sensitivity to distinguish different constant keys used in each context.

8 Conclusions

JavaScript is a uniquely challenging language for pointer analysis. We have shown that property sensitivity is essential for JavaScript points-to analysis precision, but that extending a standard implementation of Andersen's analysis with property sensitivity increases its worst-case running time from $O(N^3)$ to $O(N^4)$, where N is the size of the program. Moreover, in practice we found that a straightforward property-sensitive points-to analysis could not scale to handle several popular JavaScript frameworks. We proposed a solution based on local tracking of key correlations, implemented via context-sensitive analysis of newly-extracted methods. Our evaluation showed that our technique dramatically improved the scalability of the property-sensitive analysis, making precise call graph construction for several popular JavaScript frameworks practical for the first time.

In future work, we plan to study how to apply Chaudhuri's techniques [5] to improve our worst-case running time bound for property-sensitive points-to analysis. We also plan to explore techniques for online detection of pollution in points-to analysis results (i.e., as the analysis is running), to enable the application of our method extraction and context-sensitivity techniques more generally.

9. Overall Process Flow

FIG. 15 is an operational flow diagram illustrating one example of a process for transforming a program to facilitate points-to analysis. The process begins in step 1502 and immediately proceeds to step 1504 with accessing at least a portion of program code, such as JavaScript. In step 1506, a method with at least one dynamic property correlation is identified for extraction. In one example, the method m for extraction is identified that contains one or more dynamic property writes x[v]=y in the program code, and where the method m identified for extraction satisfies two conditions: i) a dynamic property write that occurs in m and is in a loop with at least one loop variable in a set of loop variables of the method m; and ii) v is data dependent on i.

In step 1508, when a method m is not identified, the process terminates in step 1518. Otherwise, when a method is identified in response to these two conditions, a body of the loop l in the method m is extracted in step 1510. A new method $m_p$ is created to include the body of the loop l with the variable i as a parameter. The body of the loop l is substituted in the program code with a call to the new method $m_p$ to create a transformed program code.

In one example, in step 1512, at least one new method $m_p$ is created for each loopvariable i in a set of loop variables $p_i$ in the method m for extraction. The new method $m_p$ is substituted to replace the extracted method m. The new method $m_p$ is substituted for the extracted method m in step 1514.

In one example in step 1516, context sensitivity is applied. Specifically, in step 1516 the creating the new method m includes creating at least one new method $m_p$ for each loop variable i in a set of loop variables $p_i$ in the method m for extraction; and substituting the method m of the program code with the new method $m_p$. The process ends in step 1518.

10. Information Processing System

Figure 16:
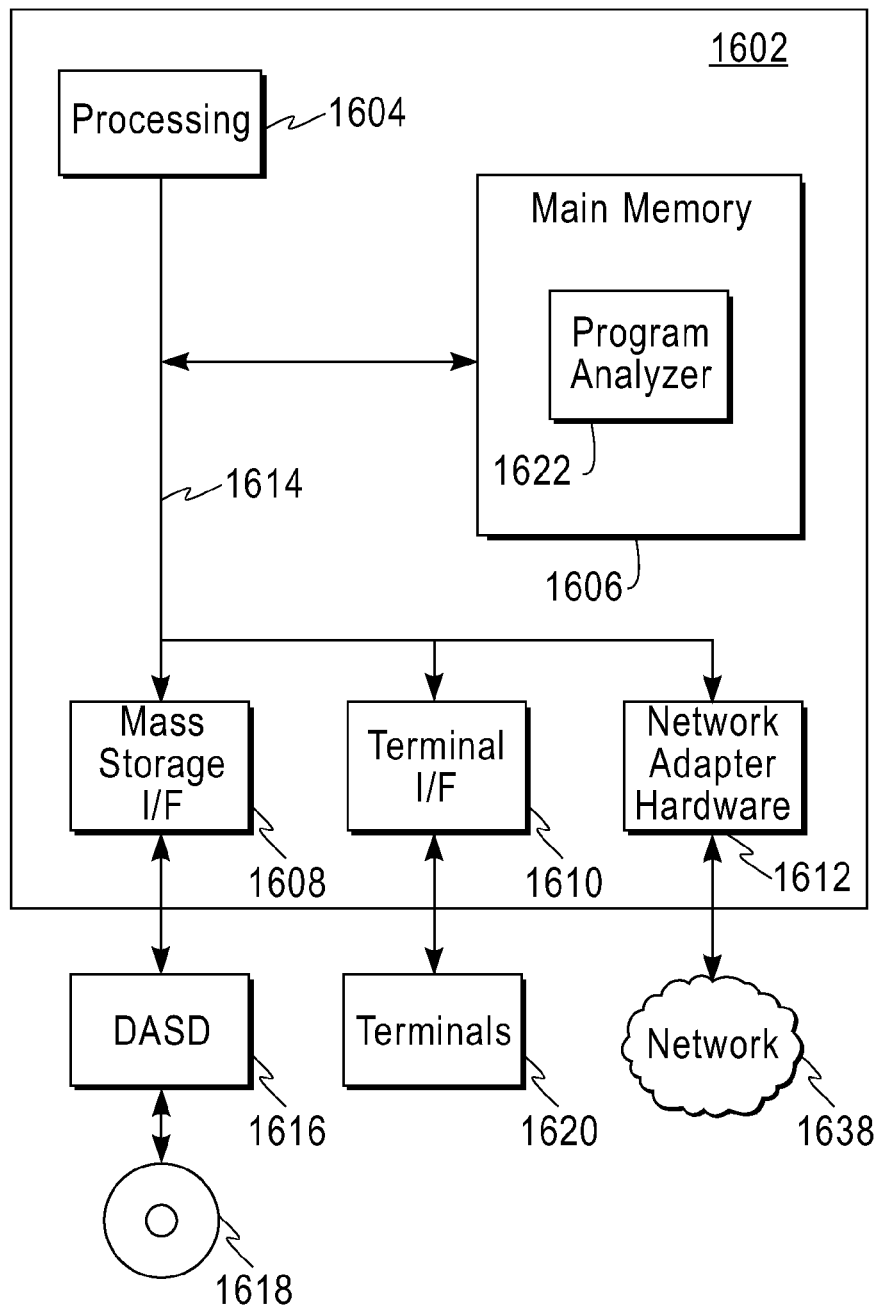
FIG. 16 is a block diagram illustrating a detailed view of an information processing system according to one example of the present invention.

Referring now to FIG. 16, this figure is a block diagram illustrating an information processing system that can be utilized in embodiments of the present invention. The information processing system 1600 is based upon a suitably configured processing system adapted to implement one or more embodiments of the present invention (e.g., the user system 102 of FIG. 1). Any suitably configured processing system can be used as the information processing system 1600 in embodiments of the present invention.

The information processing system 1600 includes a computer 1602. The computer 1602 has a processor(s) 1604 that is connected to a main memory 1606, mass storage interface 1608, and network adapter hardware 1610. A system bus 1612 interconnects these system components. Although only one CPU 1604 is illustrated for computer 1602, computer systems with multiple CPUs can be used equally effectively. The main memory 1606, in this embodiment, comprises the mapping tool 103, the schema mapping merger 104 and its components, and the schema mappings 105.

The mass storage interface 1608 is used to connect mass storage devices, such as mass storage device 1614, to the information processing system 1600. One specific type of data storage device is an optical drive such as a CD/DVD drive, which can be used to store data to and read data from a computer readable medium or storage product such as (but not limited to) a CD/DVD 1616. Another type of data storage device is a data storage device configured to support, for example, NTFS type file system operations.

An operating system included in the main memory is a suitable multitasking operating system such as any of the Linux, UNIX, Windows, and Windows Server based operating systems. Embodiments of the present invention are also able to use any other suitable operating system. Some embodiments of the present invention utilize architectures, such as an object oriented framework mechanism, that allows instructions of the components of an operating system to be executed on any processor located within the information processing system 1600. The network adapter hardware 1610 is used to provide an interface to a network 1618. Embodiments of the present invention are able to be adapted to work with any data communications connections including present day analog and/or digital techniques or via a future networking mechanism.

Non-limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

REFERENCES

Each of the twenty-four references are incorporated by reference in their entirety.

[1] O. Agesen. The cartesian product algorithm: Simple and precise type inference of parametric polymorphism. In ECOOP, 1995.

[2] J. D. An, A. Chaudhuri, J. S. Foster, and M. Hicks. Dynamic inference of static types for Ruby. In POPL, pages 459-472, 2011.

[3] L. O. Andersen. Program Analysis and Specialization for the C Programming Language. PhD thesis, University of Copenhagen, DIKU, 1994.

[4] G. Balakrishnan and T. W. Reps. Recency-abstraction for heapallocated storage. In SAS, pages 221-239, 2006.

[5] S. Chaudhuri. Subcubic algorithms for recursive state machines. In POPL, 2008.

[6] ECMA. ECMAScript Language Specification, 5th edition, 2009. ECMA-262.

[7] M. Fähndrich, J. S. Foster, Z. Su, and A. Aiken. Partial online cycle elimination in inclusion constraint graphs. In Conference on Programming Language Design and Implementation (PLDI), Montreal, Canada, June 1998.

[8] A. Feldthaus, T. Millstein, A. Møller, M. Schäfer, and F. Tip. Tool supported refactoring for JavaScript. In Proc. ACM SIGPLAN Conference on Object-Oriented Programming, Systems, Languages, and Applications (OOPSLA'11), October 2011.

[9] S. Guarnieri and B. Livshits. Gulfstream: Incremental static analysis for streaming JavaScript applications. In Proceedings of the USENIX Conference on Web Application Development, June 2010.

[10] S. Guarnieri and V. B. Livshits. Gatekeeper: Mostly static enforcement of security and reliability policies for javascript code. In USENIX Security Symposium, pages 151-168, 2009.

[11] S. Guarnieri, M. Pistoia, O. Tripp, J. Dolby, S. Teilhet, and R. Berg. Saving the world wide web from vulnerable javascript. In Proceedings of the International Symposium on Software Testing and Analysis (ISSTA'11), 2011. To appear.

[12] A. Guha, C. Saftoiu, and S. Krishnamurthi. The Essence of JavaScript. In Proc. 24th European Conference on Object-Oriented Programming, ECOOP '10, volume 6183 of LNCS. Springer-Verlag, June 2010.

[13] S. H. Jensen, A. Møller, and P. Thiemann. Type Analysis for JavaScript. In Proc. 16th International Static Analysis Symposium, SAS '09, volume 5673 of LNCS. Springer-Verlag, August 2009.

[14] S. H. Jensen, A. Møller, and P. Thiemann. Interprocedural Analysis with Lazy Propagation. In Proc. 17th International Static Analysis Symposium, SAS '10, volume 6337 of LNCS. Springer-Verlag, September 2010.

[15] J. Kodumal and A. Aiken. Regularly annotated set constraints. In PLDI, pages 331-341, 2007.

[16] D. Melski and T. W. Reps. Interconvertibility of a class of set constraints and context-free-language reachability. Theor. Comput. Sci., 248(1-2):29-98, 2000.

[17] A. Milanova, A. Rountev, and B. G. Ryder. Parameterized object sensitivity for points-to analysis for Java. ACM Trans. Softw. Eng. Methodol., 14(1):1-41, 2005. ISSN 1049-331X.

[18] A. Rountev, A. Milanova, and B. G. Ryder. Points-to analysis for Java using annotated constraints. In OOPSLA, October 2001.

[19] M. Schäfer, M. Verbaere, T. Ekman, and O. de Moor. Stepping Stones over the Refactoring Rubicon. In Proc. 23rd European Conference on Object-Oriented Programming, ECOOP '09, volume 5653 of LNCS. Springer-Verlag, July 2009.

[20] Y. Smaragdakis, M. Bravenboer, and O. Lhoták. Pick your contexts well: understanding object-sensitivity. In POPL, pages 17-30, 2011.

[21] M. Sridharan, D. Gopan, L. Shan, and R. Bodík. Demand-driven points-to analysis for Java. In Conference on Object-Oriented Programming, Systems, Languages, and Applications (OOPSLA), 2005.

[22] O. Tripp, M. Pistoia, S. J. Fink, M. Sridharan, and O. Weisman. TAJ: effective taint analysis of web applications. In PLDI, 2009.

[23] D. Vardoulakis and O. Shivers. CFA2: A context-free approach to control-flow analysis. In ESOP, pages 570-589, 2010.

[24] Y. Zheng, T. Bao, and X. Zhang. Statically locating web application bugs caused by asynchronous calls. In WWW, pages 805-814, 2011.

What is claimed is:

1. A computer-implemented method for transforming a program to facilitate points-to analysis, the computer-implemented method comprising:
    accessing at least a portion of a program code;
    identifying at least one method m for extraction that contains one or more dynamic property writes $x[v]=y$ in the program code, wherein the at least one method m identified for extraction satisfies two conditions:
        (i) a dynamic property write occurs in the at least one method m and is in a loop l with at least one loop variable i in a set of loop variables $p_i$ of the at least one method m; and
        (ii) v is data dependent on the at least one loop variable i;
    in response to these two conditions being satisfied, extracting a body of the loop l from the at least one method m, and creating a new method $m_p$ including the body of the loop l and with the at least one loop variable i as a parameter of the new method $m_p$; and
    substituting the body of the loop l in the program code of the at least one method m with a call to the new method $m_p$ to create a transformed program code to facilitate points-to analysis.

2. The computer-implemented method of claim 1, further comprising:
    performing a context-sensitive analysis of the program in which contexts are distinguished for the new method $m_p$ based on possible values of the parameter of the new method $m_p$ corresponding to the at least one loop variable i.

3. The computer-implemented method of claim 1, further comprising:
    computing a call graph of the transformed program code.

4. The computer-implemented method of claim 3, further comprising:
    performing points-to analysis of the transformed program code.

5. The computer-implemented method of claim 3, further comprising:
    analyzing security vulnerabilities of the transformed program code.

6. The computer-implemented method of claim 3, further comprising:
    refactoring of the transformed program code for an integrated development environment tool.

7. The computer-implemented method of claim 3, further comprising:
    performing compiler optimizations on the transformed program code.

8. The computer-implemented method of claim 1, wherein accessing the at least a portion of a program code includes accessing a scripting language program code.

9. The computer-implemented method of claim 8, wherein accessing the at least a portion of a program code includes accessing a framework library of a scripting language program code.

10. A computer-implemented method for transforming a program to facilitate points-to analysis, the computer-implemented method comprising:
    accessing at least a portion of a program code;
    identifying at least one method m for extraction that contains at least one dynamic property correlation, wherein the at least one dynamic property correlation comprises at least one dynamic property write $x[v]=y$ in the program code;
    in response to dynamic property correlations being found, extracting a body of a loop l from the at least one method m, and creating a new method $m_p$ including the body of the loop l and with at least one loop variable i as a parameter of the new method $m_p$; and
    substituting the body of the loop l in the program code of the at least one method m with a call to the new method $m_p$ to create a transformed program code to facilitate points-to analysis.

11. The computer-implemented method of claim 10, further comprising:
    performing a context-sensitive analysis of the program in which contexts are distinguished for the new method $m_p$ based on possible values of the parameter of the new method $m_p$ corresponding to the at least one loop variable i.

12. The computer-implemented method of claim 10, further comprising:
    computing a call graph of the transformed program code.

13. The computer-implemented method of claim 12, further comprising:
    performing points-to analysis of the transformed program code.

14. The computer-implemented method of claim 12, further comprising:
    analyzing security vulnerabilities of the transformed program code.

15. The computer-implemented method of claim 12, further comprising:
    refactoring of the transformed program code for an integrated development environment tool.

16. The computer-implemented method of claim 12, further comprising:
    performing compiler optimizations on the transformed program code.

17. The computer-implemented method of claim 12, wherein accessing the at least a portion of a program code includes accessing a scripting language program code.

18. The computer-implemented method of claim 10, wherein accessing the at least a portion of a program code includes accessing a framework library of a scripting language program code.

19. A system for transforming a program to facilitate points-to analysis, the system comprising:
    a memory; and
    at least one processor communicatively coupled to the memory and configured to:
        access at least a portion of a program code;
        identify at least one method m for extraction that contains at least one dynamic property correlation, wherein the at least one dynamic property correlation comprises at least one dynamic property write x[v]=y in the program code;

in response to dynamic property correlations being found, extract a body of a loop l from the at least one method m, and creating a new method $m_p$ including the body of the loop l and with at least one loop variable i as a parameter of the new method $m_p$; and substitute the body of the loop l in the program code of the at least one method m with a call to the new method $m_p$ to create a transformed program code to facilitate points-to analysis.

20. The system of claim 19, wherein the at least one processor is further configured to:

perform a context-sensitive analysis of the program in which contexts are distinguished for the new method $m_p$ based on possible values of the parameter of the new method $m_p$ corresponding to the at least one loop variable i.

21. A computer program product for transforming a program to facilitate points-to analysis comprising a non-transitory computer readable storage medium having computer readable program code embodied therewith, the computer readable program code configured to:

access at least a portion of a program code;

identify at least one method m for extraction that contains at least one dynamic property correlation, wherein the at least one dynamic property correlation comprises at least one dynamic property write x[v]=y in the program code;

in response to dynamic property correlations being found, extract a body of a loop l from the at least one method m, and creating a new method $m_p$ including the body of the loop l and with at least one loop variable i as a parameter of the new method $m_p$; and substitute the body of the loop l in the program code of the at least one method m with a call to the new method $m_p$ to create a transformed program code to facilitate points-to analysis.

22. The computer program product of claim 21, wherein the computer readable program code is further configured to:

perform a context-sensitive analysis of the program in which contexts are distinguished for the new method $m_p$ based on possible values of the parameter of the new method $m_p$ corresponding to the at least one loop variable i.

* * * * *